(12) United States Patent
Shah et al.

(10) Patent No.: US 6,858,297 B1
(45) Date of Patent: Feb. 22, 2005

(54) ALIGNED FIBER WEB

(75) Inventors: Rahul Shah, Woodbury, MN (US);
Douglas C. Sundet, Hudson, WI (US);
Tien T. Wu, Woodbury, MN (US);
John M. Brandner, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/818,096

(22) Filed: Apr. 5, 2004

(51) Int. Cl.[7] .................................................. D02G 3/00
(52) U.S. Cl. ...................... 428/401; 428/179; 428/220; 428/137; 428/172; 428/364; 428/332; 428/359; 156/167; 264/518; 264/517
(58) Field of Search ................................ 428/179, 220, 428/137, 172, 332, 359, 364, 401; 156/167; 264/518, 517

(56) References Cited

U.S. PATENT DOCUMENTS

| | | | |
|---|---|---|---|
| 3,959,421 A | 5/1976 | Weber et al. | |
| 3,971,373 A | 7/1976 | Braun | |
| 4,429,001 A | 1/1984 | Kolpin et al. | |
| 4,547,950 A | 10/1985 | Thompson | |
| 4,588,537 A | 5/1986 | Klasse et al. | |
| 4,622,259 A | 11/1986 | McAmish et al. | |
| 4,798,575 A | 1/1989 | Siversson | |
| 4,798,850 A | 1/1989 | Brown | |
| 4,976,677 A | 12/1990 | Siversson | |
| 5,075,068 A | 12/1991 | Milligan et al. | |
| 5,141,699 A | 8/1992 | Meyer et al. | |
| 5,240,479 A | 8/1993 | Bachinski | |
| 5,389,175 A | 2/1995 | Wenz | |
| 5,405,559 A | 4/1995 | Shaunbaugh | |
| 5,496,507 A | 3/1996 | Angadjivand et al. | |
| 5,652,048 A | 7/1997 | Haynes et al. | |
| 5,665,278 A | 9/1997 | Allen et al. | |
| 5,667,749 A | 9/1997 | Lau et al. | |
| 5,709,735 A | 1/1998 | Midkiff et al. | |
| 5,772,948 A | 6/1998 | Chenowith | |
| 5,782,944 A | 7/1998 | Justice | |
| 5,811,178 A | 9/1998 | Adam et al. | |
| 5,820,645 A | 10/1998 | Murphy, Jr. | |
| 5,908,598 A | 6/1999 | Rousseau et al. | |
| 6,102,039 A | 8/2000 | Springett et al. | |
| D449,100 S | 10/2001 | Sundet et al. | |
| 6,397,458 B1 | 6/2002 | Jones et al. | |
| 6,398,847 B1 | 6/2002 | Jones et al. | |
| 6,409,806 B1 | 6/2002 | Jones et al. | |
| 6,521,011 B1 * | 2/2003 | Sundet et al. | ............... 55/499 |
| 2003/0089090 A1 | 5/2003 | Sundet et al. | |
| 2003/0089091 A1 | 5/2003 | Sundet et al. | |

* cited by examiner

*Primary Examiner*—Merrick Dixon
(74) *Attorney, Agent, or Firm*—David R. Cleveland; Karl G. Hanson

(57) ABSTRACT

Nonwoven webs having substantially aligned fibers can be formed in an apparatus having a direction of motion corresponding to the direction of web formation. The web is formed in the presence of at least one secondary fluid stream that oscillates the filaments or resulting attenuated fibers to and fro generally in and against the direction of motion so that a majority of the collected fibers are aligned within ±20° of the direction of motion and fibers having lengths of about 1–10 cm can be teased from the web. The resulting nonwoven webs are especially useful for forming pleated filtration media having pleats generally transverse to the direction of motion.

35 Claims, 7 Drawing Sheets

ALIGNED FIBER WEB

This invention pertains to fibrous filtration webs and a method of making such webs where the webs exhibit fiber alignment in the machine direction and have lengths of 1 to 10 centimeters.

BACKGROUND

Meltblown nonwoven fibrous webs are used for a variety of purposes including filtration (e.g., flat web and pleated filters), insulation, padding and textile substitutes. References relating to meltblown nonwoven fibrous webs include U.S. Pat. No. 3,959,421 (Weber et al.), U.S. Pat. No. 4,622,259 (McAmish et al.), U.S. Pat. No. 5,075,068 (Milligan et al.), U.S. Pat. No. 5,141,699 (Meyer et al.), U.S. Pat. No. 5,405,559 (Shambaugh), U.S. Pat. No. 5,652,048 (Haynes et al.), U.S. Pat. No. 5,665,278 (Allen et al.), U.S. Pat. No. 5,667,749 (Lau et al.), U.S. Pat. No. 5,772,948 (Chenoweth) and U.S. Pat. No. 5,811,178 (Adam et al.). References relating to pleated filters include U.S. Pat. No. 4,547,950 (Thompson), U.S. Pat. No. 5,240,479 (Bachinski), U.S. Pat. No. 5,709,735 (Midkiff et al.), U.S. Pat. No. 5,820,645 (Murphy, Jr.) and U.S. Pat. No. 6,521,011 B1 (Sundet et al. '011), and U.S. Patent Application Publication Nos. US 2003/0089090 A1 (Sundet et al. '090) and US 2003/0089091 A1 (Sundet et al. '091).

SUMMARY OF THE INVENTION

Nonwoven web manufacture typically involves deposition of fibers on a moving collector surface. Perhaps partly as a consequence of this motion, the collected web may exhibit a small degree of fiber alignment in the machine direction, and to a small extent some anisotropic physical properties (e.g., tensile strength) in the machine and transverse directions. Nonwoven web manufacturers often strive however to make products having well-balanced and generally isotropic physical properties.

We have found that by forming nonwoven webs having much greater than normal fiber alignment in the machine direction, we can obtain webs with improved mechanical properties or improved filtration performance. The resultant webs are particularly useful for forming pleated filtration media having pleats generally transverse to the machine direction. The present invention provides, in one aspect, a method for forming a fibrous filtration web comprising:
  a) melt-blowing a fiber-forming thermoplastic material through an array of nozzles in the presence of a primary fluid stream to form a plurality of filaments that are attenuated into fibers and directed towards a porous collection surface having a direction of motion;
  b) impinging at least one secondary fluid stream upon the filaments or fibers to oscillate the fibers to and fro generally in and against the direction of motion; and
  c) collecting the fibers on the porous collection surface to form a nonwoven meltblown web
wherein the secondary fluid stream causes the fibers to oscillate sufficiently so that a majority of the collected fibers are aligned within ±20° of the direction of motion, and wherein in a web that has not been heat treated, fibers having lengths of about 1 to about 10 cm can be teased from the web.

In another aspect, the invention provides a fibrous filtration material in the form of a web having an elongate lengthwise dimension corresponding to a direction of web formation and a narrow widthwise dimension transverse to the lengthwise dimension, the web comprising nonwoven thermoplastic fibers a majority of which are aligned within ±20° of the direction of web formation, and wherein in a web that has not been heat treated, fibers having lengths of about 1 to about 10 cm can be teased from the web.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not to scale.

DETAILED DESCRIPTION

Figure 1:
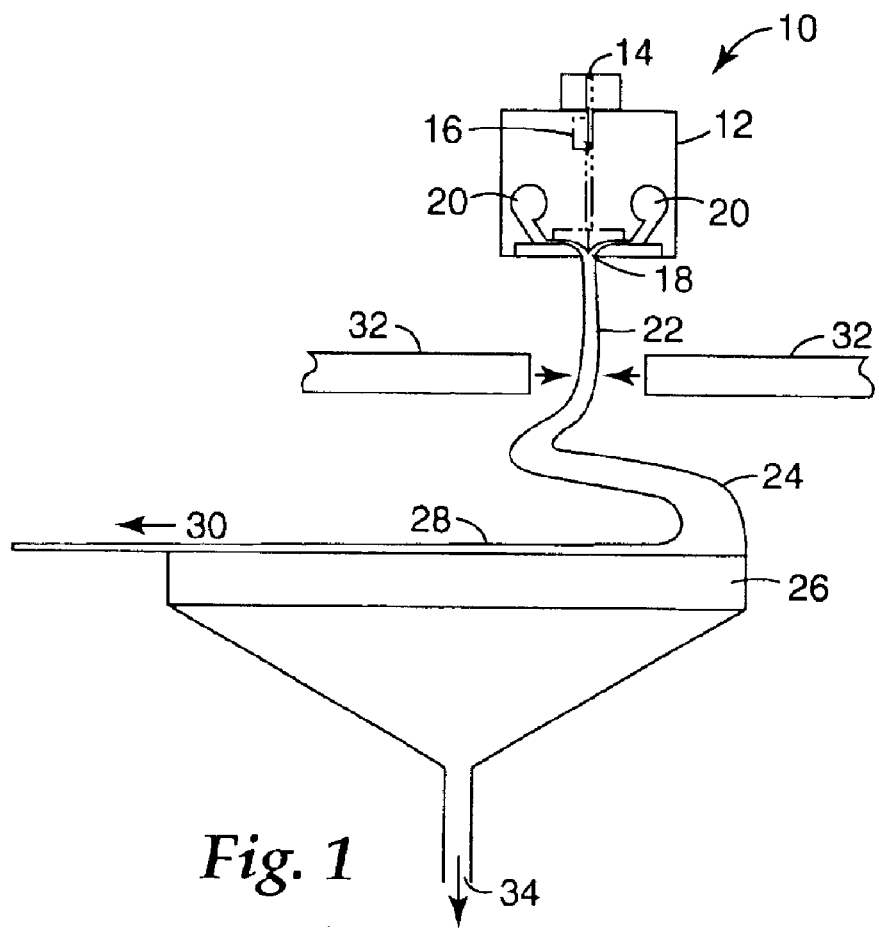
FIG. 1 is a schematic side view of a meltblowing apparatus for making nonwoven webs having fibers substantially aligned in the machine direction.

The phrase "nonwoven web" refers to a fibrous web characterized by entanglement or point bonding of the fibers.

The phrase "filtration web" refers to a porous web capable of removing at least particles having an average particle diameter greater than 10 μm from a stream of air flowing at a 0.5 m/sec face velocity at an initial pressure drop no greater than about 50 mm $H_2O$.

The phrase "attenuating the filaments into fibers" refers to the conversion of a segment of a filament into a segment of greater length and smaller diameter.

The word "meltblowing" refers to a method for forming a nonwoven web by extruding a fiber-forming material through a plurality of orifices to form filaments while contacting the filaments with air or other attenuating fluid to attenuate the filaments into fibers and thereafter collecting a layer of the attenuated fibers.

The phrase "meltblown web" refers to a nonwoven web made using meltblowing.

The phrase "nonwoven die" refers to a die for use in meltblowing.

The phrases "meltblown fibers" and "blown microfibers" refer to fibers made using meltblowing.

The phrase "machine direction" when used with respect to a meltblown web or to a meltblowing apparatus for meltblown web formation refers to the in-plane direction of web fabrication.

The phrase "transverse direction" when used with respect to a meltblowing apparatus or a meltblown web refers to the in-plane direction perpendicular to the machine direction.

The phrase "row direction" when used with respect to a pleated filter element refers to a direction generally parallel to the pleat ridges and valleys in a filter element having a folded structure with parallel, generally sharp-edged creases, and to a direction generally parallel to the pleat crowns and base regions in a filter element having a corrugated structure with parallel, generally smooth undulations.

The term "self-supporting" when used with respect to a web refers to a web having sufficient coherency and strength so as to be drapable and handleable without substantial tearing or rupture, and when used with respect to a pleated filter refers to a filter whose pleats have sufficient stiffness so that they do not collapse or bow excessively when subjected to the air pressure typically encountered in forced air ventilation systems.

A variety of polymers may be employed to make the disclosed aligned fiber webs. Representative polymers are thermoplastic, extrudable and can be processed using a meltblowing apparatus, and include polyolefins such as polyethylene, polypropylene or polybutylene; polyamides; polyesters such as polyethylene terephthalate; and other materials that will be familiar to those skilled in the art. Polyolefins are particularly preferred.

A variety of sorbent particles can be added to the nonwoven webs if desired. Representative sorbent particles are disclosed in U.S. Pat. No. 3,971,373 to Braun, U.S. Pat. No. 4,429,001 to Kolpin et al. and U.S. Pat. No. 6,102,039 to Springett et al. Activated carbon and alumina are particularly preferred sorbent particles. Mixtures of sorbent particles can be employed, e.g., to absorb mixtures of gases, although in practice to deal with mixtures of gases it may be better to fabricate a multilayer pleated filter employing separate sorbent particles in the individual layers. If employed, preferably at least 80 weight percent sorbent particles, more preferably at least 84 weight percent sorbent particles and most preferably at least 90 weight percent sorbent particles are enmeshed in the web.

A variety of primary and secondary fluid streams may be employed in the invention. Air is an especially convenient fluid for both purposes. The remainder of this application will discuss the use of air, sometimes referred to as "primary air" or as "secondary quench air" as the context may require. Those skilled in the art can readily employ other fluids (e.g., carbon dioxide, nitrogen or water) with appropriate modification of the operating parameters described below.

FIG. 1 shows a schematic side view of meltblowing apparatus 10. Molten polymer enters meltblowing die 12 through inlet 14 and passes through die cavity 16. Small orifices (not shown in FIG. 1) in die tip 18 cause the molten polymer to form filaments 22 upon exiting die 12. Primary air supplied through inlets 20 impinges upon the filaments 22 and attenuates them into fibers 24. Fibers 24 land on flat collector 26 and form nonwoven web 28 which can be drawn away from collector 26 in the direction of web formation (viz., the machine direction) 30 by a suitable take-up apparatus (not shown in FIG. 1). On route to collector 26, secondary quench air supplied to ducts 32 arrayed across the width of web 28 impinges upon the filaments or fibers, causing the fibers to oscillate to and fro generally in and against the machine direction. The collected fibers in the resulting web 28 are substantially more aligned in the machine direction than would be the case without the secondary quench air supply. The web's machine direction and transverse direction mechanical properties (e.g., its machine direction and transverse direction stiffness and tensile strength) also exhibit greater anisotropy than when a secondary quench air supply is not employed.

Viewed from the side (or transverse direction) using high-speed photography, fibers 24 are laid down on collector 26 in a "paintbrush" fashion. Measured at the collector, the oscillations can have a very large machine direction amplitude, e.g., more than one fourth the die to collector distance ("DCD") and in some instances more than half the DCD. Several operating conditions may be especially desirable to achieve such paintbrush deposition. For example, the oscillations may occur regularly, may have increasing amplitude en route to the collector, and may have a wavelength for one complete cycle that is less than the distance from the secondary quench air outlets to the collector. Preferably the distance from the secondary quench air outlets to the collector is not overly long. The fibers may in some instances exhibit a whip-like action at their peak machine direction displacement en route to the collector, and may momentarily move towards the meltblowing die rather than always moving toward the collector. Apparent fiber breakage can sometimes be seen as such whip-like action occurs.

We have been able to tease fibers with discrete lengths (e.g., between about 1 and about 10 cm, along with occasional shorter or longer fibers) from the collected webs using tweezers. Ordinarily it is quite difficult to remove any fibers (or any fibers of such lengths) from conventional nonwoven webs, as the fibers typically are restrained in the web by fiber-to-fiber bonding or by interfiber entanglement.

Web 28 can be used as is, or further treated. For example, heat treatments (e.g., annealing, using equipment not shown in FIG. 1) can provide a stiffer web. Heat treatments may however make it more difficult to tease fibers from the web, as the fibers may tend to fracture and the web may have greater inter-fiber bonding or entanglement. Preferred annealing times and temperatures will depend on various factors including the polymeric fibers employed. As a general guide, annealing times and temperatures of about 100° C. up to the polymer melting point for a time less than about 10 minutes are preferred.

A vacuum can optionally be drawn thorough orifice 34 to assist in consolidating web 28. Overdensification (e.g., using calendaring) may however destroy the web's filtration capability. Electric charge can be imparted to the fibers by contacting them with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al. or tribocharging as disclosed in U.S. Pat. No. 4,798,850 to Brown. Additives may also be included in the fibers to enhance the web's filtration performance, mechanical properties, aging properties, surface properties or other characteristics of interest. Representative additives include fillers, nucleating agents (e.g., MILLAD™ 3988 dibenzylidene sorbitol, commercially available from Milliken Chemical), UV stabilizers (e.g., CHIMASSORB™ 944 hindered amine light stabilizer, commercially available from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be apparent to those skilled in the art.

The completed webs may have a variety of effective fiber diameter ("EFD") sizes, basis weights and solidity (ratio of polymer volume to web volume) values. Preferred EFDs are about 3 to about 25 µm for flat blown microfiber ("BMF") filtration layers (more preferably about 7 to about 25 µm), and about 10 to about 25 µm for BMF pleated filters. Preferred basis weights are about 15 to 100 g/m² for flat BMF filtration layers, and about 50 to about 100 g/m² for BMF pleated filters. Preferred solidity values are about 5 to about 15% for flat BMF filtration layers or BMF pleated filters.

The disclosed webs have substantial machine direction (direction of motion or direction of web formation) fiber alignment. As a general guide for use with webs made from polypropylene, preferably about 55 to about 90% of the fibers are aligned within ±20° of the direction of motion, and more preferably about 70 to about 85%. For webs made from other polymeric materials the numbers may be lower or higher. For example, as a general guide for webs made from polyethylene terephthalate, preferably about 51 to about 80% of the fibers are aligned within ±20° of the direction of motion, and more preferably about 60 to about 80%. As a general guide for webs made from nylon, preferably about 51 to about 70% of the fibers are aligned within ±20° of the direction of motion. Very highly aligned webs can be formed, e.g., webs having at least 80% of the collected fibers aligned within ±10° of the direction of motion.

The disclosed webs have one or more anisotropic mechanical properties. One class of preferred webs may have at least a 2:1 ratio of the in-plane direction of motion tensile strength to transverse direction of motion tensile strength using a 50 mm gauge length, and more preferably at least a 3:1 ratio. Another class of preferred webs may have at least a 2:1 ratio of the in-plane direction of motion Taber Stiffness to transverse direction of motion Taber Stiffness, and more preferably at least about 2.2:1.

It is possible to construct the disclosed apparatus and operate it under conditions that do not provide the disclosed aligned fiber webs, or under conditions that will provide weak webs poorly suited to filtration. For example, if insufficient secondary quench air is employed then the above-described oscillations may not occur and the fibers may not align substantially in the machine direction. Excessively high quench velocities may provide loftier webs having less interfiber bonding and entanglement and improved filtration performance, but having severely diminished mechanical properties such as stiffness and pleatability. Thus it generally will be preferable to employ secondary quench air within a range of mass flow ratios or volumes. As an example for webs made using polypropylene and secondary air chilled to below ambient temperature, a ratio of about 500 to about 2000 grams of secondary quench air per gram of extruded polymer may be preferred, as may be secondary quench air outlet velocities of about 15 to about 60 m/sec. These ranges may need to be adjusted empirically based on factors such as the meltblowing die and polymer employed, the target basis weight, target web solidity and target extent of fiber alignment and mechanical property anisotropy. Pulsation of the secondary quench air may also be employed but appears not to be necessary. Instead it appears to be better simply to adjust the secondary quench air flow upwards or downwards to a steady state value that provides collected webs having the desired final properties.

Figure 2:
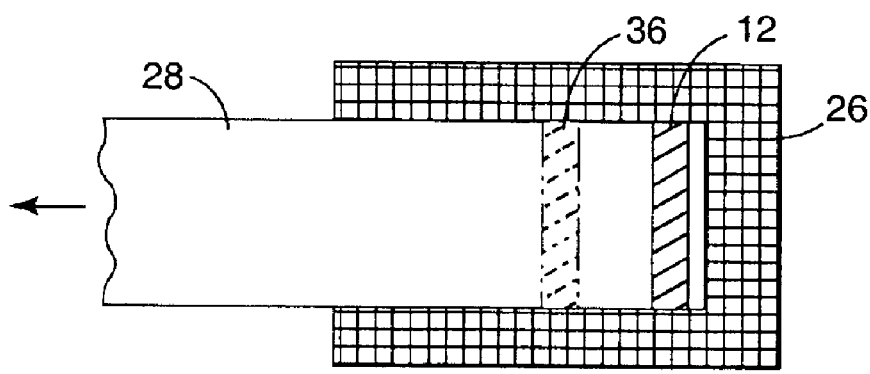
FIG. 2 is an overhead view of a vacuum collector for use in the apparatus of FIG. 1.

FIG. 2 shows a schematic overhead view of collector 26. Die 12 is positioned close to the leading edge of collector 26, but can be moved downweb to positions such as position 36 in order to alter the properties of web 28. Such repositioning may for example provide webs having reduced Taber Stiffness. If a conventional cylindrical collector surface is employed instead of a flat collector then it usually will be more difficult to obtain webs whose fibers are substantially aligned in the machine direction, and the webs may have lower Taber Stiffness. Excessive DCD lengths or excessive distances from the secondary quench air outlets to the collector may also be detrimental, e.g., by causing too many oscillations en route to the collector, excessive fiber attenuation or excessive fiber breakage.

Further details regarding the manner in which meltblowing would be carried out using an apparatus like that shown in FIG. 1 and FIG. 2 will be familiar to those skilled in the art.

The fibrous filtration webs can be further stiffened if desired using a variety of techniques. For example, an adhesive can be employed to laminate together layers of the web, e.g., as described in U.S. Pat. No. 5,240,479 (Bachinski). The web can also be made using conjugate fibers, e.g., as described in U.S. Pat. No. 5,709,735 (Midkiff et al.).

Figure 7:
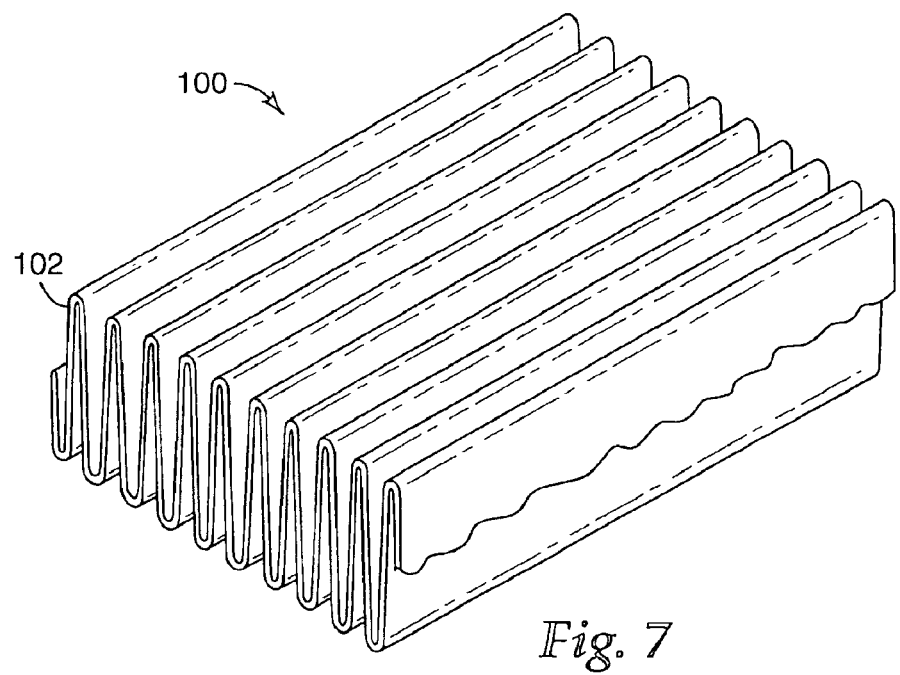
FIG. 7 is a perspective view of pleated filtration media.
Figure 8:
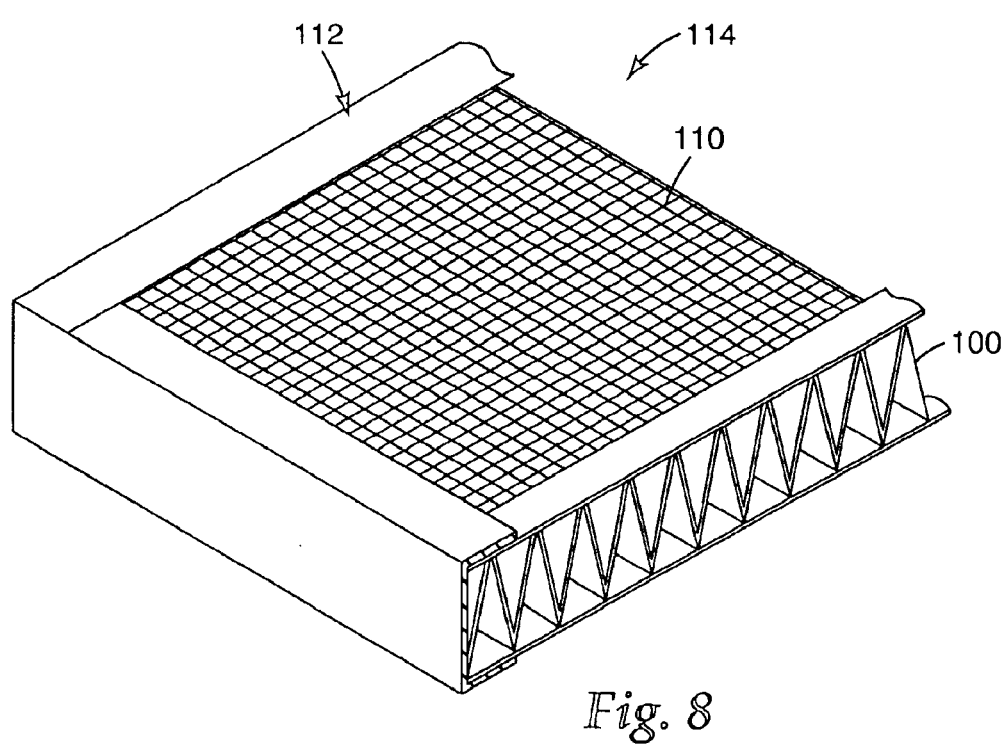
FIG. 8 is a perspective view, partially in section, of a pleated filter mounted in a frame.

The fibrous filtration webs may be employed in a variety of applications including ventilation (e.g., furnace and clean room filters), pollution control (e.g., baghouse filters), liquid treatment (e.g., water filters), personal protection (e.g., filtering face masks), chemical or biological analysis (e.g., affinity membranes), medical devices (e.g., dialysis equipment) and other applications that will be familiar to those skilled in the art. Pleated filter media is an especially preferred application. For example, FIG. 7 shows pleated filter media 100 having rows of pleats 102. The rows are aligned in the transverse direction, and the substantially-aligned fibers in web 100 are aligned at 90°±20° with respect to the row direction, that is, at ±20° with respect to the machine direction. FIG. 8 shows pleated filter media 100 and an expanded metal support 110 mounted in frame 112 to provide filter 114. The increased stiffness of pleated media 100 and the substantial machine direction fiber alignment transverse to the row direction both are believed to contribute to increased resistance of pleated media 100 to pleat deformation at high filter face velocities. Further details regarding such pleated filter media can be found in copending U.S. patent application Ser. No. 10/818,091, filed even date herewith and entitled PLEATED ALIGNED WEB FILTER, the disclosure of which is incorporated herein by reference.

The invention will now be described with reference to the following non-limiting examples, in which all parts and percentages are by weight unless otherwise indicated. Several measurements were carried out as follows:

Effective Fiber Diameter

Effective geometric fiber diameters were evaluated according to the method set forth in Davies, C. N., "The Separation of Airborne Dust and Particles," Institution of Mechanical Engineers, London, Proceedings 1B, 1952.

Optical/Visual Web Properties

The overall visual web appearance was evaluated using a Zeiss Instruments dissecting microscope equipped with a charge coupled device camera having an 8 mm×14 mm magnification window.

Taber Stiffness

Web stiffness was evaluated using a Model 150-B TABER™ stiffness tester (commercially available from Taber Industries). Square 3.8 cm×3.8 cm sections were carefully vivisected from the webs using a sharp razor blade to prevent fiber fusion, and evaluated to determine their stiffness in the machine and transverse directions using 3 to 4 samples and a 15° sample deflection.

Stress-strain

Stress-strain (or load vs. elongation) was measured using a Model 5544 INSTRON™ universal testing machine (commercially available from Instron Corp.). Rectangular 2.5 cm×6.3 cm sections were cut from the webs using a sharp razor blade and evaluated to determine the maximum force and elongation at maximum force, using 6 to 10 samples, a 50 mm initial jaw separation and a 3 cm/min stretch rate.

Filtration Quality Factor

Filtration quality factors ($Q_F$) were determined using a TSI™ Model 8130 high-speed automated filter tester (commercially available from TSI Inc.) and a dioctyl phthalate ("DOP") challenge aerosol flowing at 42.5 L/min. Calibrated photometers were employed at the filter inlet and outlet to measure the DOP concentration and the % DOP penetration through the filter. An MKS pressure transducer (commercially available from MKS instruments) was employed to measure pressure drop ($\Delta P$, mm H$_2$O) through the filter. The equation:

$$Q_F = \frac{-\ln\left(\frac{\%\ DOP\ \text{penetration}}{100}\right)}{\Delta P}$$

was used to calculate $Q_F$. $Q_F$ values can be reported as a curve plotting $Q_F$ vs. the DOP challenge total mass after various time periods. However, the initial $Q_F$ value usually provides a reliable indicator of overall performance, with higher initial $Q_F$ values indicating better filtration performance and lower initial $Q_F$ values indicating reduced filtration performance. Initial filtration quality factors $Q_F$ of at least about 0.6 (using 100 ppm dioctyl phthalate particles having a size range between 10 and 700 nm traveling at a 7 cm/sec face velocity), more preferably at least about 0.8 and most preferably at least about 1 are preferred.

Filtration Performance

Filtration performance was evaluated according to ASHRAE standard 52.2, "Method of Testing General Ventilation Air-Cleaning Devices for Removal Efficiency by Particle Size". The ASHRAE standard evaluates filtration of a test aerosol containing laboratory-generated potassium chloride particles dispersed into an airstream. A particle counter measures and counts the particles in 12 size ranges upstream and downstream from the filter. The results can be reported as minimum composite efficiency values for particles in various size ranges. The minimum composite efficiency values correspond to the minimum percent particle retention (the downstream particle count/upstream particle count×100 for the size range in question) as the filter is loaded to a final pressure drop of 25.4 mm H$_2$O. A set of particle size removal efficiency (PSE) performance curves at incremental dust loading levels may also be developed, and together with an initial clean performance curve may be used to form a composite curve representing the minimum performance in each size range. Points on the composite curve are averaged and the averages used to determine the minimum efficiency reporting value (MERV) for the filter.

EXAMPLES 1–3 AND COMPARISON EXAMPLE 1

Polypropylene Webs

A conventional 20.5 cm wide meltblowing apparatus was modified by addition of a secondary air quench system and a flat-bed collector arranged as in FIG. 1. In a conventional blown microfiber process, secondary quench air would not be employed and the web would be collected on a rounded surface such as a porous drum. The modified apparatus was used to make meltblown polypropylene webs whose fibers were highly aligned in the machine direction. The secondary air quench system employed two opposed horizontally-disposed 76 cm wide×51 cm high air outlets disposed approximately 6 cm below the meltblowing die tip, dispensing 12–13° C. chilled air flowing at various rates (or not at all) through the air outlets. The flat-bed collector employed a vacuum collection system located under the bed. The meltblowing die was positioned over the leading edge of the collector. FINA™ type 3960 polypropylene (commercially available from Fina Oil and Chemical Co.) was melted in an extruder operated at 265° C. and fed at 9.1 kg/hr to the meltblowing die. The die was maintained at about 265° C. using resistance heaters and supplied with 300° C. primary air flowing at 4.2 m$^3$/min. The DCD was adjusted to provide webs having a 0.5 mm H$_2$O pressure drop at a 32.5 L/min flow rate. For webs prepared using secondary quench air, the DCD was approximately 20 cm. For webs prepared without secondary quench air, the DCD was approximately 34 cm. The collector vacuum was adjusted to provide webs having 8–9% solidity. The collector vacuum was 3250 N/m$^2$ for webs prepared using secondary quench air at 50 or 35 m/sec outlet velocity, 5000 N/m$^2$ for webs prepared using secondary quench air at 17 m/sec outlet velocity, and zero for webs prepared without secondary quench air. The collected webs had an 80 g/m$^2$ basis weight and a 19 μm EFD. The webs were corona-treated as described in U.S. Pat. No. 4,588,537 to Klasse et al., hydrocharged as described in U.S. Pat. No. 5,908,598 to Rousseau et al. and evaluated to determine their mechanical properties and filtration quality factor $Q_F$. The webs were also heat treated at 126° C. for 5 minutes and reevaluated to determine their mechanical properties.

Set out below in Table 1 are the Example No. or Comparison Example No., secondary air velocity and mass flow ratio, the fiber count and fiber alignment data, and the filtration quality factor $Q_F$ for each web. Set out below in Table 2 are the machine direction ("MD") and transverse direction ("TD") Taber Stiffness and tensile strength values for the each web, and the ratio of MD to TD Taber Stiffness and tensile strength. Set out below in Table 3 are the MD and TD Taber Stiffness and tensile strength values for the heat treated webs, and the ratio of MD to TD Taber Stiffness and tensile strength.

TABLE 1

| Example No. or Comp. Example No. | Secondary Air Velocity at Outlet (m/sec) | Mass Ratio, Secondary Air:Polymer | Total No. of Measured Fibers | No. of Fibers within 0–10° of MD | Fibers within 0–10° of MD (%) | No. of Fibers within 0–20° of MD | Fibers within 0–20° of MD (%) | Filtration Quality Factor, $Q_F$ |
|---|---|---|---|---|---|---|---|---|
| 1 | 50 | 1770 | 38 | 30 | 80 | 34 | 89 | 1.65 |
| 2 | 35 | 1450 | 33 | 20 | 61 | 27 | 82 | 1.5 |

TABLE 1-continued

| Example No. or Comp. Example No. | Secondary Air Velocity at Outlet (m/sec) | Mass Ratio, Secondary Air:Polymer | Total No. of Measured Fibers | No. of Fibers within 0–10° of MD | Fibers within 0–10° of MD (%) | No. of Fibers within 0–20° of MD | Fibers within 0–20° of MD (%) | Filtration Quality Factor, $Q_F$ |
|---|---|---|---|---|---|---|---|---|
| 3 | 17 | 720 | 32 | 16 | 50 | 32 | 56 | 0.85 |
| Comp. Ex. 1 | 0 | 0 | 33 | 11 | 33 | 33 | 57 | 0.7 |

TABLE 2

| Example No. or Comp. Example No. | Secondary Air Velocity at Outlet (m/sec) | Mass Ratio, Secondary Air:Polymer | Taber Stiffness, MD | Taber Stiffness, TD | Ratio, Taber Stiffness MD:TD | Tensile Strength, MD (dynes) | Tensile Strength, TD (dynes) | Ratio, Tensile Strength MD:TD |
|---|---|---|---|---|---|---|---|---|
| 1 | 50 | 1770 | 1.3 | 0.6 | 2.2 | 1773 | 635 | 2.8 |
| 2 | 35 | 1450 | 1.9 | 0.7 | 2.7 | 2270 | 730 | 3.1 |
| 3 | 17 | 720 | 2.1 | 1.1 | 1.9 | 1374 | 1101 | 1.2 |
| Comp. Ex. 1 | 0 | 0 | 1.5 | 1.3 | 1.2 | 1670 | 1370 | 1.2 |

TABLE 3

(Heat Treated)

| Example No. or Comp. Example No. | Secondary Air Velocity at Outlet (m/sec) | Mass Ratio, Secondary Air:Polymer | Taber Stiffness, MD | Taber Stiffness, TD | Ratio, Taber Stiffness MD:TD | Tensile Strength, MD (dynes) | Tensile Strength, TD (dynes) | Ratio, Tensile Strength MD:TD |
|---|---|---|---|---|---|---|---|---|
| 1 | 50 | 1770 | 1.2 | 0.7 | 1.7 | 2298 | 780 | 2.9 |
| 2 | 35 | 1450 | 1.9 | 0.7 | 2.7 | 2303 | 765 | 3.0 |
| 3 | 17 | 720 | 2.5 | 1.6 | 1.6 | 1770 | 1100 | 1.6 |
| Comp. Ex. 1 | 0 | 0 | 2.5 | 2.0 | 1.3 | 1700 | 1489 | 1.1 |

Figure 3:
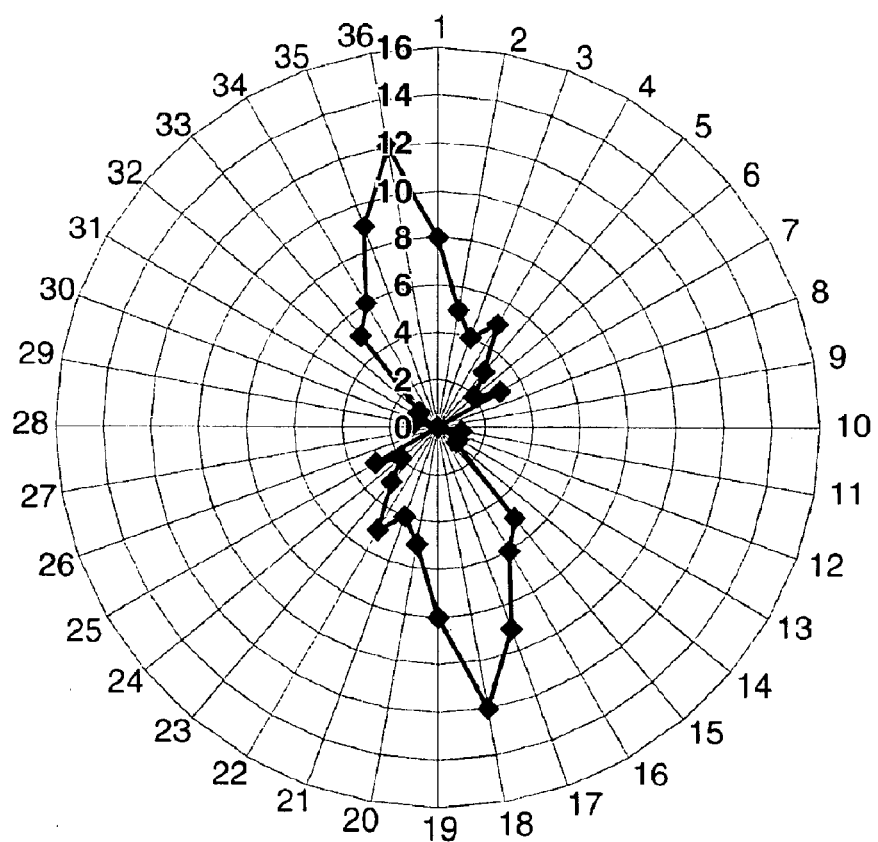
FIGS. 3–6 are radar plots showing fiber alignment.
Figure 4:
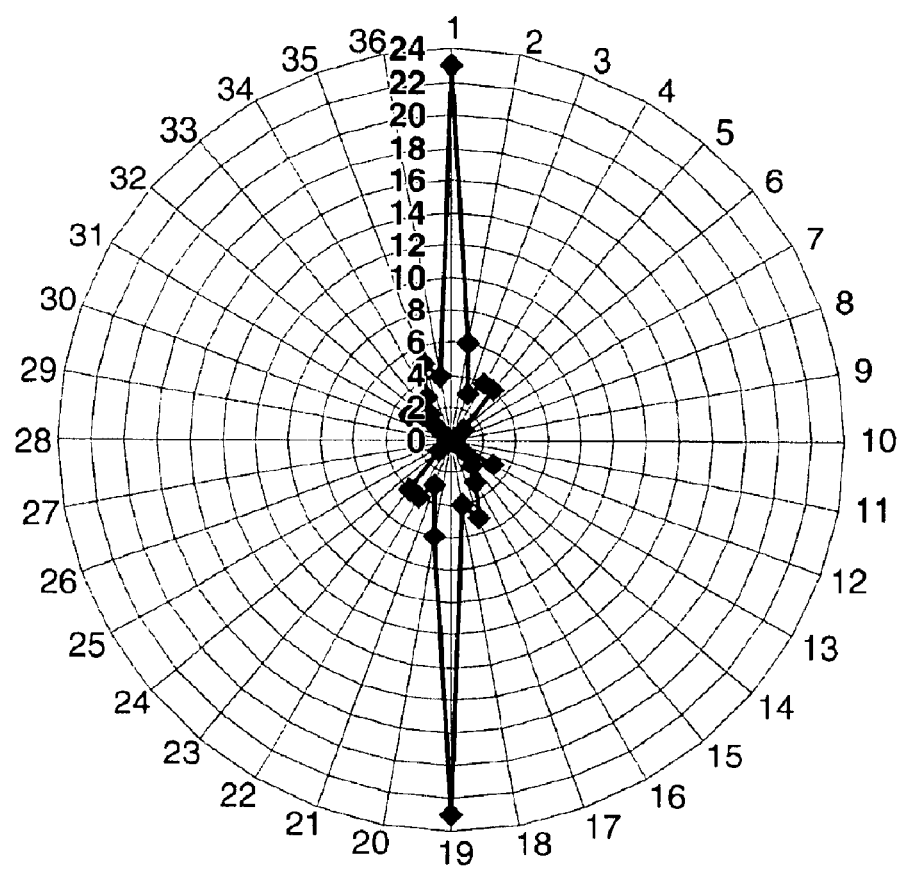
Figure 5:
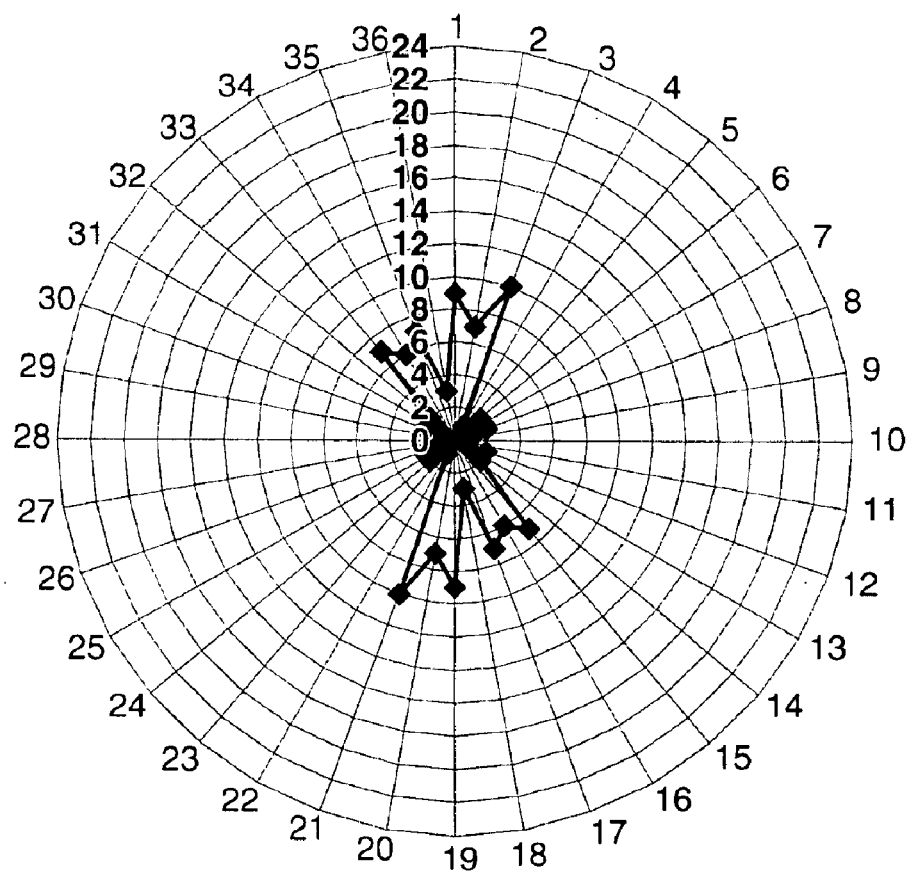
Figure 6:
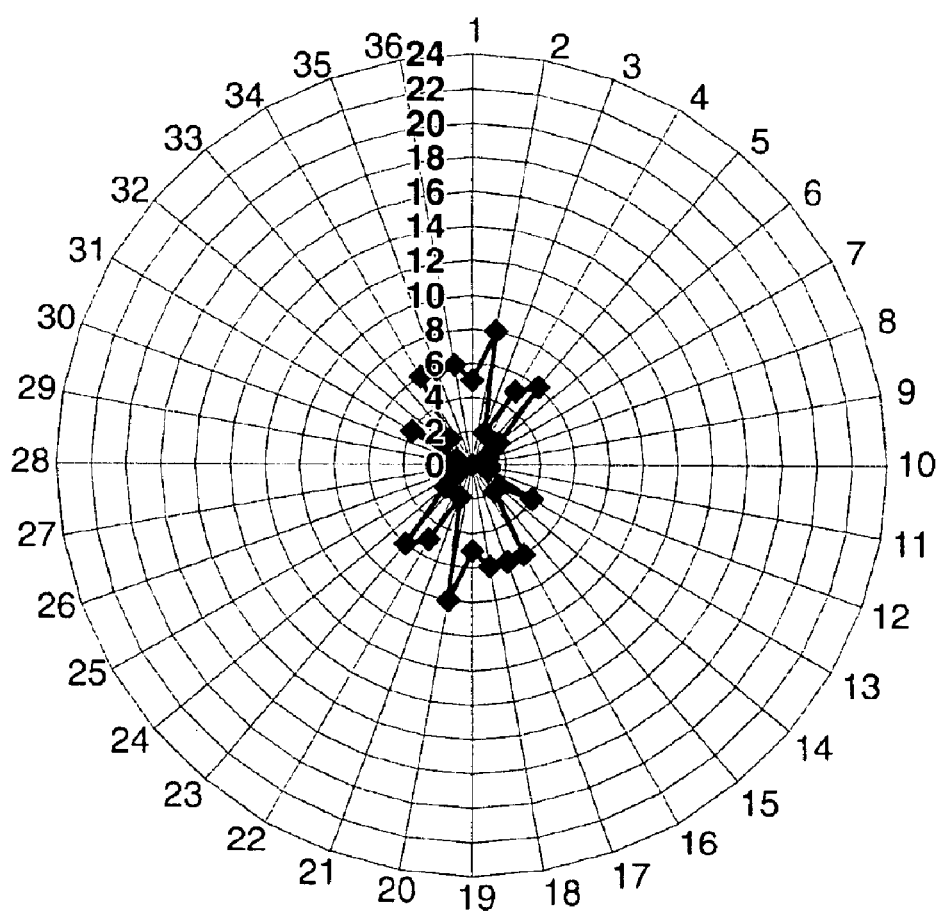

As shown in Table 1, webs made using secondary quench air had significantly greater machine direction fiber alignment than webs made without secondary quench air. This is further illustrated in FIGS. 3–6, which are polar "radar" plots respectively showing the number and orientation (in degrees with respect to the 0° machine direction) of fibers in Examples 1–3 and Comparison Example 1. Because fibers oriented at 0° with respect to the machine direction could also be said to be oriented at 180°, the plots have symmetric lobes reflected about the origin. FIG. 3 shows for example that 12 fibers were oriented at 0° with respect to the machine direction, 9 fibers were oriented at –10°, 8 fibers were oriented at +10°, 6 fibers were oriented at –20°, and so on. FIGS. 3–5 show that the disclosed webs had considerably greater machine direction alignment than the web prepared without secondary quench air plotted in FIG. 6. In a further comparison, the FIG. 4 web shown in the Lau et al. '749 patent was evaluated to determine its fiber orientation and fiber count, and found to have only 50% of its fibers aligned within ±20° of the machine direction.

The FIGS. 3–5 plots generally mirror the behavior of a wetting fluid placed on the non-collector side of the web. If a drop of a suitable wetting fluid (preferably colored to aid in observation) is so placed it will tend to spread into the web in an oblong pattern generally corresponding to the radar plot lobe shapes, thus providing a convenient indicator of the primary direction of fiber orientation and web formation. When a wetting fluid is placed on the Comparison Example 1 web, it tends to spread more or less evenly outward in an expanding circular pattern.

Table 1 also shows that as the secondary quench air volume increased, the filtration quality factor $Q_F$ increased and then decreased slightly.

Webs prepared using secondary air had visible striations generally aligned in the machine direction, a surface with an overall smooth sheen and slight fuzziness, and few or none of the nodules that usually are found in conventional blown microfiber webs. Fibers having approximately 2 to 5 cm lengths could be teased from the webs using tweezers. Webs prepared without secondary quench air visually resembled standard blown microfiber webs collected on a round collector. Some relatively short (less than 1 cm) individual fibers could be removed from these webs using tweezers, but only with great difficulty.

As shown in Table 2, webs made using secondary quench air had significantly more anisotropic Taber Stiffness than webs made without secondary quench air. Webs made using higher volumes of secondary quench air also had significantly more anisotropic tensile strength than webs made without secondary quench air.

As shown in Table 3, heat treating could be used to increase web stiffness and tensile strength. For several of the webs this could be done without causing a substantial change in the web's overall mechanical anisotropy as measured using MD:TD property ratios.

EXAMPLES 4–6

Smaller EFD Webs

Using the general method of Example 1, meltblown polypropylene webs were prepared using 300° C. primary air flowing at 3.4 m³/min and secondary quench air and collector vacuum adjusted to provide collected webs having an 80 g/m² basis weight, 8–9% solidity and smaller effective fiber diameters than were obtained in Example 1. Set out below in Table 4 are the Example No., secondary air velocity and mass flow ratio, effective fiber diameter and the fiber count and fiber alignment data for the resulting webs.

TABLE 4

| Example No. | Secondary Air Velocity at Outlet (m/sec) | Mass Ratio, Secondary Air:Polymer | EFD | Total No. of Measured Fibers | No. of Fibers within 0–10° of MD | Fibers within 0–10° of MD (%) | No. of Fibers within 0–20° of MD | Fibers within 0–20° of MD (%) |
|---|---|---|---|---|---|---|---|---|
| 4 | 22.5 | 930 | 13.5 | 38 | 24 | 63 | 29 | 76 |
| 5 | 20 | 830 | 13.4 | 41 | 20 | 49 | 26 | 63 |
| 6 | 14.5 | 620 | 7.4 | 43 | 18 | 42 | 26 | 60 |

As shown in Table 4, webs having substantial machine direction fiber alignment could be made at a variety of effective fiber diameters.

EXAMPLES 7–10 AND COMPARISON EXAMPLES 2 AND 3

PET and Nylon Webs

Using the general method of Example 1, polyethylene terephthalate ("PET") and nylon (ULTRAMID™ BS-400N nylon, commercially available from BASF Corp.), were employed to prepare nonwoven webs using 350° C. primary air flowing at 2.9 m³/min and optional secondary quench air. A 12.7 cm DCD was used to prepare the PET webs and a 16.5 cm DCD was used to prepare the nylon webs. The collected PET webs had an 85 g/m² basis weight, 5–6% solidity and a 16 $\mu$m EFD. The collected nylon webs had a 70 g/m² basis weight, 5–6% solidity and a 17–18 $\mu$m EFD. Set out below in Table 5 are the Example No. or Comparison Example No., secondary air velocity and mass flow ratio, polymer employed and the fiber count and fiber alignment data for the resulting webs.

TABLE 5

| Example No. or Comp. Ex. No. | Secondary Air Velocity at Outlet (m/sec) | Mass Ratio, Secondary Air:Polymer | Polymer | Total No. of Measured Fibers | No. of Fibers within 0–10° of MD | Fibers within 0–10° of MD (%) | No. of Fibers within 0–20° of MD | Fibers within 0–20° of MD (%) |
|---|---|---|---|---|---|---|---|---|
| 7 | 35 | 1450 | PET | 41 | 26 | 63 | 32 | 78 |
| 8 | 22.5 | 930 | PET | 36 | 21 | 58 | 25 | 69 |
| Comp. Ex. 2 | 0 | 0 | PET | 38 | 9 | 23 | 12 | 31 |
| 9 | 35 | 1450 | Nylon | 33 | 17 | 50 | 21 | 64 |
| 10 | 22.5 | 930 | Nylon | 45 | 16 | 35 | 23 | 52 |
| Comp. Ex. 3 | 0 | 0 | Nylon | 38 | 10 | 26 | 19 | 50 |

As shown in Table 5, webs having substantial machine direction fiber alignment could be made using a variety of polymers.

EXAMPLE 11

Additive

Example 2 was repeated using a 1.5% addition of the additive poly(4-methyl-1-pentene). This increased the filtration quality factor $Q_F$ from 1.5 without the additive to 1.7 with the additive.

EXAMPLE 12

Additives

Example 11 was repeated using a 1.5% addition of the additive poly(4-methyl-1-pentene) and a 0.5% addition of CHIMASSORB 944 hindered amine light stabilizer. The web was hydrocharged but not corona-treated. The filtration quality factor $Q_F$ was 2.5, and more than double that obtained using webs made from conventional untreated polypropylene blown microfibers made without secondary quench air.

EXAMPLE 13 AND COMPARISON EXAMPLE 4

$Q_F$ Evaluation Over Time

Using the general method of Example 1, meltblown polypropylene webs were prepared with and without secondary quench air flowing at a 1770 secondary quench air:polymer mass flow ratio, corona-treated, hydrocharged, and evaluated to determine their filtration quality factor $Q_F$. The webs had an 85 g/m² basis weight, 19–21 $\mu$m EFD, and a pressure drop of 0.4–0.5 mm $H_2O$ at 42.5 L/min. Set out below in Table 6 are the $Q_F$ factors after various cumulative DOP exposure levels for the web made with (Example 13) or without (Comparison Example 4) secondary quench air.

TABLE 6

| Cumulative DOP Challenge, (mg) | Example 13 Web, $Q_F$ | Comparison Example 4 Web, $Q_F$ |
|---|---|---|
| Initial | 1.8 | 0.7 |
| 50 | 1 | 0.2 |
| 100 | 0.6 | 0.15 |
| 150 | 0.45 | 0.1 |
| 200 | 0.3 | <0.1 |

As shown in Table 6, a web made using secondary quench air and having substantial machine direction fiber alignment provided significantly better filtration performance than a web made without secondary quench air and having less fiber alignment.

EXAMPLES 14 AND 15 AND COMPARISON EXAMPLES 5–7

Pleated Furnace Filters

The corona-treated and hydrocharged Example 2 webs, the corona-treated and hydrocharged Comparison Example 1 webs and a sample of ACCUAIR™ corona-treated spunbond polyethylene/polypropylene twinned fiber web (71 g/m² basis weight, ~20 µm EFD, commercially available from Kimberly Clark Corp.) were formed into 50.8 cm×63.5 cm×2.1 cm filter elements having pleats 102 like pleated media 100 shown in FIG. 7. The pleats 102 were arranged so that the folds were aligned with the transverse direction, with 87 pleats (13.8 pleats/10 cm) along the long dimension. The pleated media 100 was sandwiched between and glued to expanded metal supports like support 110 and mounted in a cardboard frame like frame 112 shown in FIG. 8 to form a framed filter like filter 114. The finished filters were evaluated for filtration performance according to ASHRAE standard 52.2, "Method of Testing General Ventilation Air-Cleaning Devices for Removal Efficiency by Particle Size" at a 1.5 m/sec face velocity. The results reported below in Table 7 show the minimum composite efficiency values for particles in the size ranges 0.3 to 1 µm, 1 to 3 µm and 3 to 10 µm. Table 7 also reports the total filter weight gain (total particulate weight captured by the filter) after completion of the evaluation. Higher minimum composite efficiency and total filter weight gain values correspond to better filtration, longer service life or both better filtration and longer service life.

composite efficiency than a commercial spunbond nonwoven web (Comparison Example 7). The Example 14 and Example 15 webs had better particle capture (as evidenced by their higher total filter weight gain values) than the Comparison Example 5–7 webs.

EXAMPLES 16–18 AND COMPARISON EXAMPLE 8

Pleated Furnace Filter Face Pressure Drop vs. Velocity Evaluation

Using the general method of Examples 14 and 15, a meltblown aligned fiber polypropylene web was corona-treated and hydrocharged but not heat treated. This web had a 1.7 MD Taber Stiffness value and is identified below as the web of Example 16. A stiffer web was prepared using corona-treatment, hydrocharging and heat treatment. This web had a 2.2 MD Taber Stiffness value and is identified below as the web of Example 17. A yet stiffer web was prepared using a 1.5% addition of the additive poly(4-methyl-1-pentene), corona-treatment, hydrocharging and heat treatment. This web had a 3.7 MD Taber Stiffness value and is identified below as the web of Example 18. The Example 16–18 webs and a sample of ACCUAIR corona-treated spunbond polyethylene/polypropylene twinned fiber web (having a 2.1 MD Taber Stiffness and identified below as the web of Comparison Example 8) were formed into 30 cm×27 cm×2.1 cm high filter elements having pleats 102 like filter media 100 shown in FIG. 7. The filters had 13.8 pleats/10 cm along the long dimension, and were sandwiched between and glued to expanded metal supports like support 110 in FIG. 8. In a series of runs, each such filter was mounted in a PLEXIGLAS™ plastic frame whose transparent side plates permitted the pleat edges to be photographed. The frame side plates touched the filtration media edges but permitted pleat movement. The frame was mounted atop a

TABLE 7

| Example No. or Comp. Ex. No. | Web Employed | Web Treatment | Initial Pressure Drop, mm H₂O | Minimum Composite Efficiency (%) 0.1 to 1 µm | Minimum Composite Efficiency (%) 1 to 3 µm | Minimum Composite Efficiency (%) 3 to 10 µm | Total Filter Weight Gain, 25.4 mm H₂O (g) |
|---|---|---|---|---|---|---|---|
| 14 | Example 2 | Corona-treated | 4.9 | 43 | 81 | 91 | 35 |
| 15 | Example 2 | Corona-treated and hydrocharged | 5.1 | 53 | 89 | 97 | 37.1 |
| Comp. Ex. 5 | Comp. Ex. 1 | Corona-treated | 4.6 | 36 | 71 | 86 | 23.8 |
| Comp. Ex. 6 | Comp. Ex. 1 | Corona-treated and hydrocharged | 4.6 | 42 | 81 | 93 | 33.9 |
| Comp. Ex. 7 | ACCUAIR web | Corona-treated | 4.6 | 41 | 80 | 91 | 26.1 |

As shown in Table 7, corona-treated or corona-treated and hydrocharged meltblown nonwoven webs made using secondary quench air and having substantial machine direction fiber alignment (Examples 14 and 15) provided much better minimum composite efficiency at a 1 mm H₂O pressure drop than otherwise similar meltblown nonwoven webs made without secondary quench air and having less fiber alignment (Comparison Examples 5 and 6). The Example 14 and Example 15 webs also had comparable or better minimum vacuum table and exposed to air from a downwardly-directed box fan. The filters were loaded by sprinkling a synthetic dust made from a 50:50 mixture of SAE Fine Test Dust and talc into the air stream until the filter pressure drop reached about 0.35 in (0.9 cm) of water at an approximate 1.5 m/sec face velocity. This simulated a substantial natural loading level. Set out below in Table 8 are the filter descriptions, MD Taber Stiffness values and total filter weight gain values.

TABLE 8

| Example No. or Comp. Ex. No. | MD Taber Stiffness | Total Filter Weight Gain (g) |
| --- | --- | --- |
| 16 | 1.7 | 37.9 |
| 17 | 2.2 | 40.2 |
| 18 | 3.7 | 33.4 |
| Comp. Ex. 8 | 2.1 | 36.2 |

Figure 9:
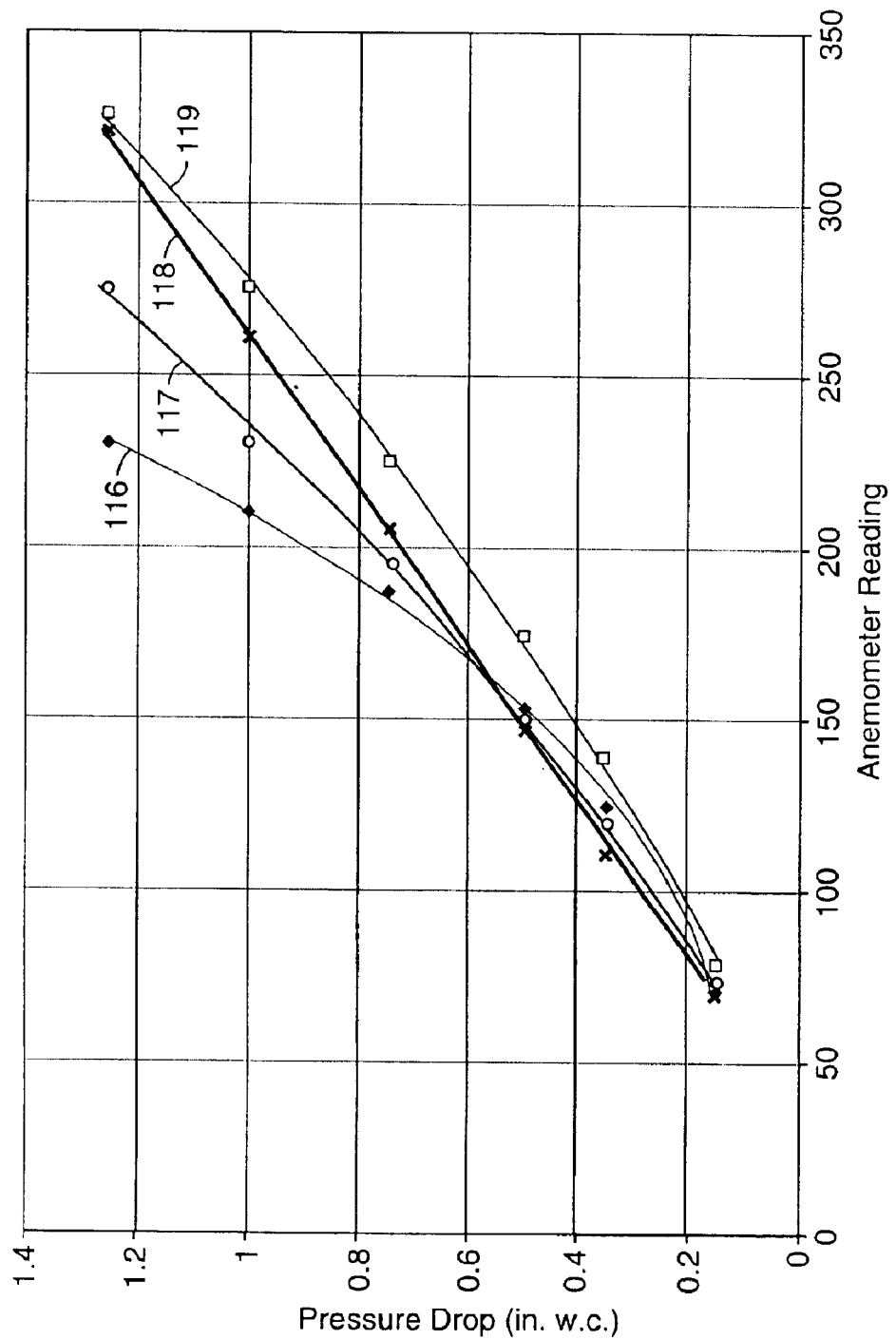
FIG. 9 is a graph showing filter pressure drop vs. air velocity.

The filters were next mounted in a duct equipped with an anemometer and exposed to flowing air at velocities sufficient to cause pressure drops between about 0.2 in. (0.5 cm) of water and 1.2 in. (3 cm) of water. The Example 16 (1.7 MD Taber Stiffness) filter began to exhibit noticeable pleat deformation, manifested by pinching together of the pleats at the filter air inlet side, at a 0.35 in (0.9 cm) pressure drop. The Example 17 (2.2 MD Taber Stiffness) and Comparison Example 8 filters began to exhibit noticeable pleat deformation at a 0.5 in (1.3 cm) pressure drop. The Example 18 (3.7 MD Taber Stiffness) filter did not exhibit noticeable pleat deformation even at a 1.2 in (3 cm) pressure drop. FIG. 9 shows a plot of the pressure drop (in inches of water) vs. anemometer reading (in nominal units) for the filters of Example 16 (curve 116), Example 17 (curve 117), Example 18 (curve 118) and Comparison Example 8 (curve 119). As shown in FIG. 9, the Example 18 filter exhibited a linear increase in pressure drop as airflow increased, whereas the other tested filters exhibited a non-linear response, indicative of pleat distortion, as airflow increased.

Various modifications and alterations of this invention will be apparent to those skilled in the art without departing from this invention. This invention should not be restricted to that which has been set forth herein only for illustrative purposes.

We claim:

1. A method of making a fibrous filtration web, which method comprises:
   a) melt-blowing a fiber-forming thermoplastic material through an array of nozzles in the presence of a primary fluid stream to form a plurality of filaments that are attenuated into fibers and directed towards a porous collection surface having a direction of motion;
   b) impinging at least one secondary fluid stream upon the filaments or fibers to oscillate the fibers generally in and against the direction of motion; and
   c) collecting the fibers on the porous collection surface to form a nonwoven meltblown web wherein the secondary fluid stream causes the fibers to oscillate sufficiently so that a majority of the collected fibers are aligned within ±20° of the direction of motion, and wherein in a web that has not been heat treated, fibers having lengths of about 1 to about 10 cm can be teased from the web.

2. A method according to claim 1 wherein about 55 to about 90% of the fibers are aligned within ±20° of the direction of motion.

3. A method according to claim 1 wherein about 70 to about 85% of the collected fibers are aligned within ±20° of the direction of motion.

4. A method according to claim 1 wherein fibers having lengths of about 2–5 cm can be teased from the web.

5. A method according to claim 1 wherein the collected fibers have an average effective fiber diameter of about 3 to about 25 μm.

6. A method according to claim 1 wherein the web has at least a 2:1 ratio of the in-plane direction of motion tensile strength to transverse direction of motion tensile strength using a 50 mm gauge length.

7. A method according to claim 1 wherein the web has at least a 4:1 ratio of the in-plane direction of motion tensile strength to transverse direction of motion tensile strength using a 50 mm gauge length.

8. A method according to claim 1 wherein the web has at least a 2:1 ratio of the in-plane direction of motion Taber Stiffness to transverse direction of motion Taber Stiffness.

9. A method according to claim 1 wherein the web has at least a 2.2:1 ratio of the in-plane direction of motion Taber Stiffness to transverse direction of motion Taber Stiffness.

10. A method according to claim 1 wherein the major surfaces of the web exhibit striations corresponding to substantial alignment of individual fibers in the direction of motion.

11. A method according to claim 1 wherein a wetting fluid placed on the web preferentially wicks in the direction of motion.

12. A method according to claim 1 wherein the secondary fluid stream comprises air at below ambient temperature.

13. A method according to claim 12 wherein the secondary fluid stream flows at a ratio of about 500 to about 2000 grams of secondary fluid per gram of polymer.

14. A method according to claim 1 wherein the fibers are laid down on the porous collection surface in a paintbrush fashion.

15. A method according to claim 1 wherein the fibers oscillate at an amplitude, as measured at the porous collection surface, that is more than one fourth the distance from the array of nozzles to the porous collection surface.

16. A method according to claim 1 wherein the fibers oscillate with increasing amplitude en route to the porous collection surface.

17. A method according to claim 1 wherein two generally opposed secondary fluid streams impinge upon the filaments or fibers.

18. A method according to claim 1 wherein the fibers exhibit a whip-like action en route to the porous collection surface.

19. A method according to claim 1 further comprising annealing the nonwoven web at a temperature between about 100° C. and the polymer melting temperature for a time less than 10 minutes.

20. A method according to claim 1 further comprising corona-treating or hydrocharging the nonwoven web.

21. A method according to claim 20 wherein the web has a filtration quality factor $Q_F$ of at least about 0.6 using 100 ppm dioctyl phthalate particles having a size range between 10 and 700 nm traveling at a 7 cm/sec face velocity.

22. A method according to claim 1 further comprising pleating the web.

23. A method according to claim 22 wherein the pleats are aligned generally transverse to the direction of motion and the pleated web forms a self-supporting filter.

24. A fibrous filtration material in the form of a web having an elongate lengthwise dimension corresponding to a direction of web formation and a narrow widthwise dimension transverse to the lengthwise dimension, the web comprising nonwoven thermoplastic fibers, a majority of which are aligned within ±20° of the direction of web formation, and wherein in a web that has not been heat treated, fibers having lengths of about 1 to about 10 cm can be teased from the web.

25. A material according to claim 24 wherein about 55 to about 90% of the fibers are aligned within ±20° of the direction of web formation.

26. A material according to claim 24 wherein about 70 to about 85% of the collected fibers are aligned within ±20° of the direction of web formation.

27. A material according to claim 24 wherein fibers having lengths of about 2–5 cm can be teased from the web.

28. A material according to claim 24 wherein the fibers have an average effective fiber diameter of about 3 to about 25 μm.

29. A material according to claim 24 wherein the web has at least a 2:1 ratio of the in-plane direction of web formation tensile strength to transverse direction of web formation tensile strength using a 50 mm gauge length.

30. A material according to claim 24 wherein the web has at least a 4:1 ratio of the in-plane direction of web formation tensile strength to transverse direction of web formation tensile strength using a 50 mm gauge length.

31. A material according to claim 24 wherein the web has at least a 2:1 ratio of the in-plane direction of web formation Taber Stiffness to transverse direction of web formation Taber Stiffness.

32. A material according to claim 24 wherein the web has at least a 2.2:1 ratio of the in-plane direction of web formation Taber Stiffness to transverse direction of web formation Taber Stiffness.

33. A material according to claim 24 wherein the major surfaces of the web exhibit striations corresponding to substantial alignment of individual fibers in the direction of web formation.

34. A material according to claim 24 wherein a wetting fluid placed on the web preferentially wicks in the direction of web formation.

35. A material according to claim 24 wherein the web has a filtration quality factor $Q_F$ of at least about 0.6 using 100 ppm dioctyl phthalate particles having a size range between 10 and 700 nm traveling at a 7 cm/sec face velocity.

* * * * *